(No Model.)

C. B. TRUMBLE.
VEGETABLE CHOPPER.

No. 500,695. Patented July 4, 1893.

Witnesses
Harry L. Amer.
N. J. Riley

Inventor
C. B. Trumble.
By his Attorneys,
C. A. Snow & Co.

UNITED STATES PATENT OFFICE.

CHAUNCEY BURDETT TRUMBLE, OF GROTON, NEW YORK, ASSIGNOR OF ONE-HALF TO HIRAM G. MOE, OF SAME PLACE.

VEGETABLE-CHOPPER.

SPECIFICATION forming part of Letters Patent No. 500,695, dated July 4, 1893.

Application filed December 17, 1892. Serial No. 455,450. (No model.)

*To all whom it may concern:*

Be it known that I, CHAUNCEY BURDETT TRUMBLE, a citizen of the United States, residing at Groton, in the county of Tompkins and State of New York, have invented a new and useful Vegetable-Chopper, of which the following is a specification.

The invention relates to improvements in vegetable choppers.

The object of the present invention is to simplify and improve the construction of vegetable choppers, and to provide an inexpensive and effective one in which there will be no liability of clogging, and in which the chopper will be automatically freed.

The invention consists in the construction and novel combination and arrangement of parts hereinafter fully described, illustrated in the accompanying drawings and pointed out in the claims hereto appended.

Figure 1:
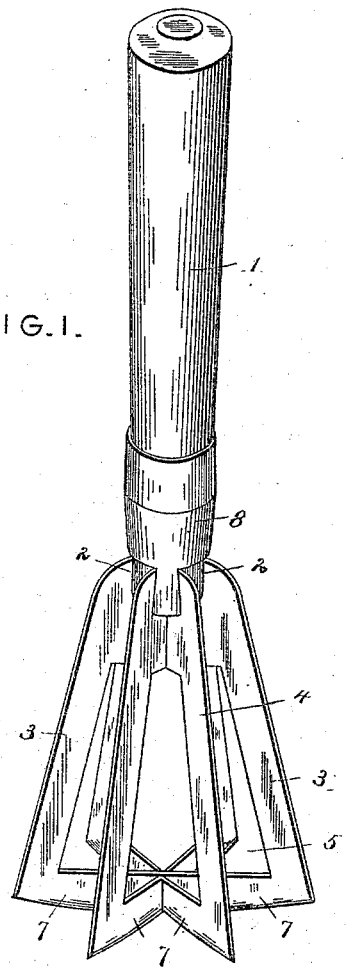
Figure 2:
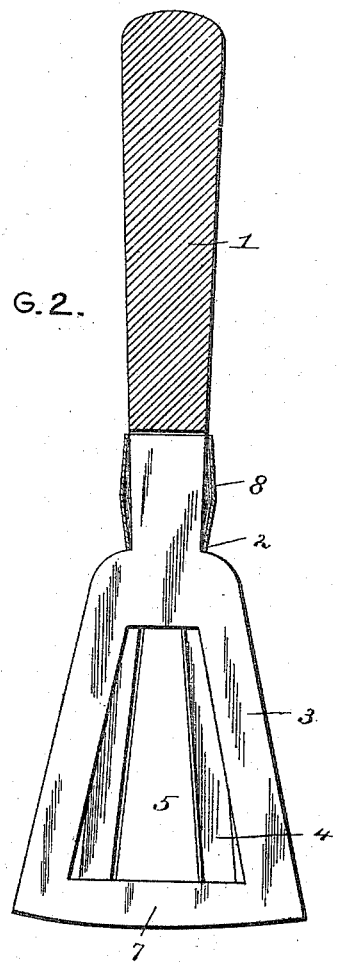
Figure 3:
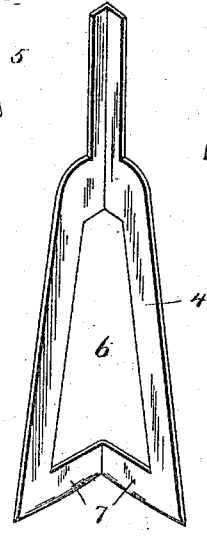

In the drawings—Figure 1 is a perspective view of a vegetable chopper constructed in accordance with this invention. Fig. 2 is a longitudinal sectional view. Fig. 3 is a detail perspective view of one of the V-shaped blades.

Like numerals of reference indicate corresponding parts in all the figures of the drawings.

1 designates a handle constructed of wood and provided at its inner end with diametrical kerfs 2, and having secured therein the shanks of a straight blade 3 and V-shaped blades 4, which are provided at their outer ends with cutting edges which are slightly curved to present an approximately convex contour. The straight blade is provided with an approximately triangular opening 5, and the V-shaped blades are provided with corresponding openings 6 extending outward from the apexes or bends, whereby a central open space is provided within the blades at the core thereof, to cause the blades to be automatically freed from material to prevent clogging. During the operation of cutting when the material rises above the lower branches 7 it will fall into the open central space and will not clog and interfere with the operation of cutting.

The handle is strengthened at the point of attachment of the blades by a ferrule 8 which covers the greater portion of the kerfs.

It will be seen that the vegetable chopper is simple and inexpensive in construction, and effective in operation, and that the material operated on will not clog it or interfere with its use. It will also be apparent that the blades, which radiate from the central opening, consist only of three pieces, and that their recesses align to form the central clearing opening, which serves to free the blades of the material operated on.

Changes in the form, proportion and the minor details of construction may be resorted to without departing from the principle or sacrificing any of the advantages of this invention.

What I claim is—

1. A chopper comprising a handle, and a series of spaced radial blades provided at their lower ends with cutting edges and having at their inner edges aligned openings, combining and forming a central clearing opening located within the series of blades and arranged above their cutting edges to prevent the material operated on from clinging to the blades, substantially as described.

2. A chopper comprising a handle, a straight approximately triangular blade and provided at its lower end with a continuous unbroken cutting edge and having a central opening forming a narrow cutting portion, and the opposite blades, V-shaped in horizontal section, arranged at the sides of the straight blade and having shanks at their upper ends, and provided at their lower ends with cutting edges, and having openings forming narrow cutting portions and aligning with the opening of the straight blade and forming a central clearing opening or space located above the radial cutting portions to free the same from the material operated on, substantially as described.

In testimony that I claim the foregoing as my own I have hereto affixed my signature in the presence of two witnesses.

CHAUNCEY BURDETT TRUMBLE.

Witnesses:
H. G. MOE,
M. C. MARSH.